(12) United States Patent
Song et al.

(10) Patent No.: US 8,197,995 B2
(45) Date of Patent: Jun. 12, 2012

(54) METHOD OF MANUFACTURING ARRAY SUBSTRATE OF TRANSREFLECTIVE LIQUID CRYSTAL DISPLAY

(75) Inventors: Young Suk Song, Beijing (CN); Seung Jin Choi, Beijing (CN); Seong Yeol Yoo, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 416 days.

(21) Appl. No.: 12/547,811

(22) Filed: Aug. 26, 2009

(65) Prior Publication Data
US 2010/0055618 A1    Mar. 4, 2010

(30) Foreign Application Priority Data

Aug. 27, 2008    (CN) .......................... 2008 1 0119133

(51) Int. Cl.
*H01L 21/00*    (2006.01)
*G03F 7/26*    (2006.01)

(52) U.S. Cl. ............................... 430/20; 349/38; 438/30

(58) Field of Classification Search .................. 430/318, 430/320, 394, 321
See application file for complete search history.

(56) References Cited

U.S. PATENT DOCUMENTS

2004/0036816 A1* 2/2004 Yun .................................. 349/43
2010/0009295 A1* 1/2010 Um et al. ...................... 430/319

FOREIGN PATENT DOCUMENTS

KR    1020070080476 A    8/2007
KR    1020070114472 A    12/2007

* cited by examiner

*Primary Examiner* — Kathleen Duda
*Assistant Examiner* — Caleen Sullivan
(74) *Attorney, Agent, or Firm* — Ladas & Parry LLP

(57) ABSTRACT

A method of manufacturing an array substrate of a transreflective LCD is provided in the invention. In the method, a gate line, a common line and an embossing pattern are formed with a full tone mask, a data line, a source/drain electrode, a reflective plate and a TFT channel region are formed with a first dual tone mask, and a pixel electrode connected with the drain electrode is formed with a second dual tone mask, and thus a horizontal electric field type transreflective LCD can be obtained.

20 Claims, 18 Drawing Sheets

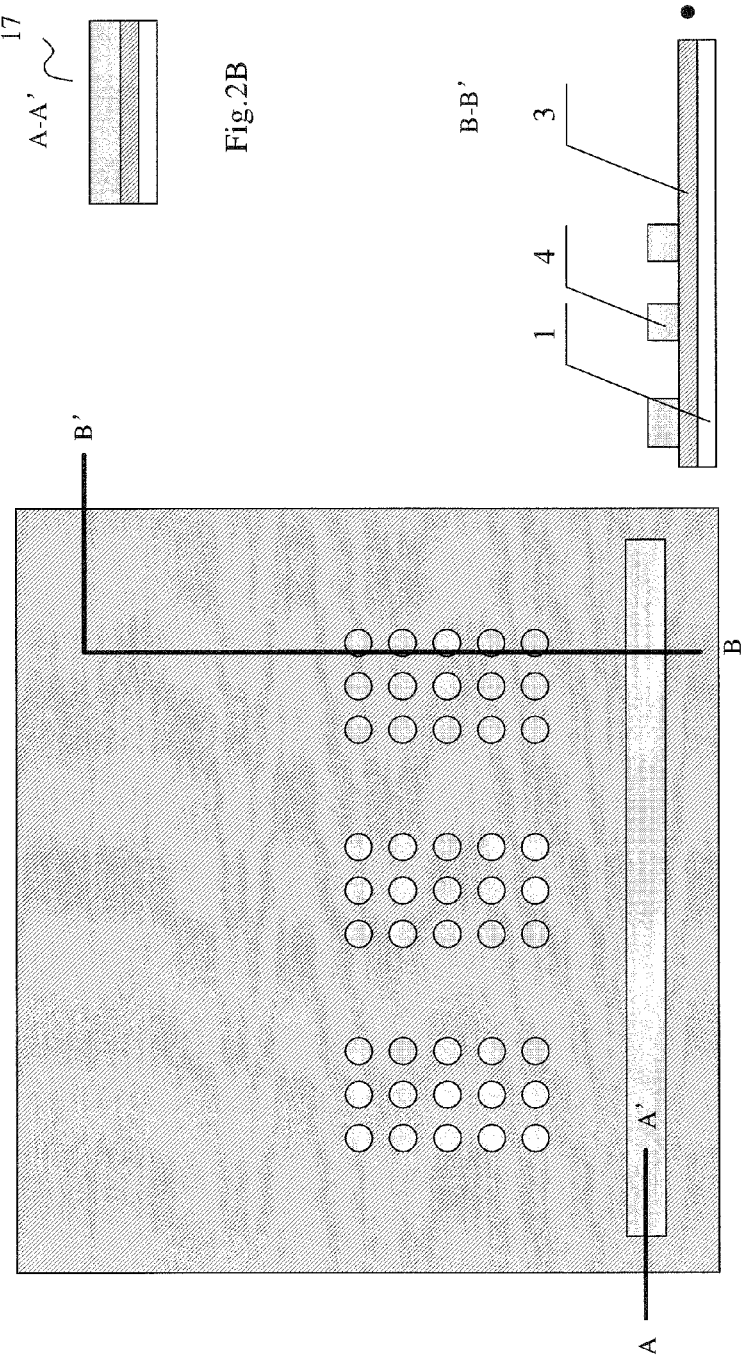
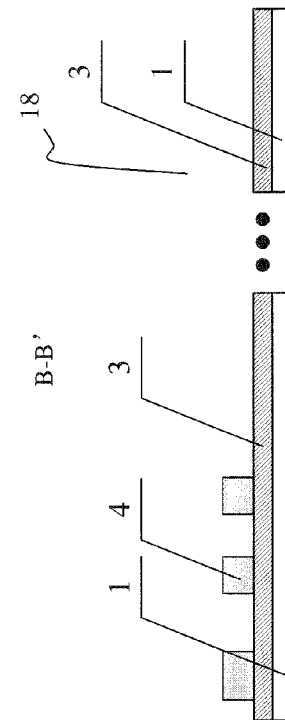
Fig.2B
Fig.2C
Fig.2A

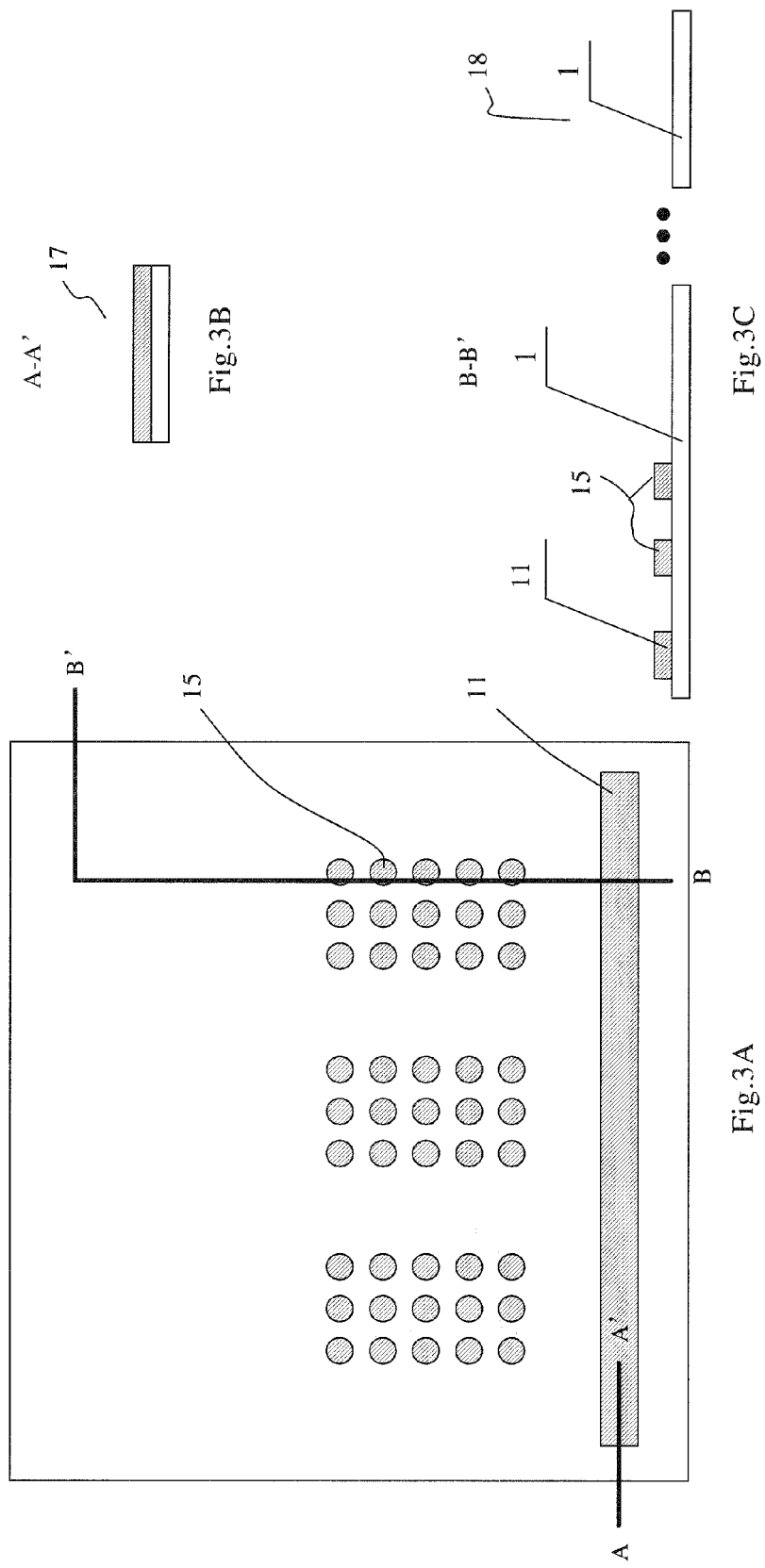

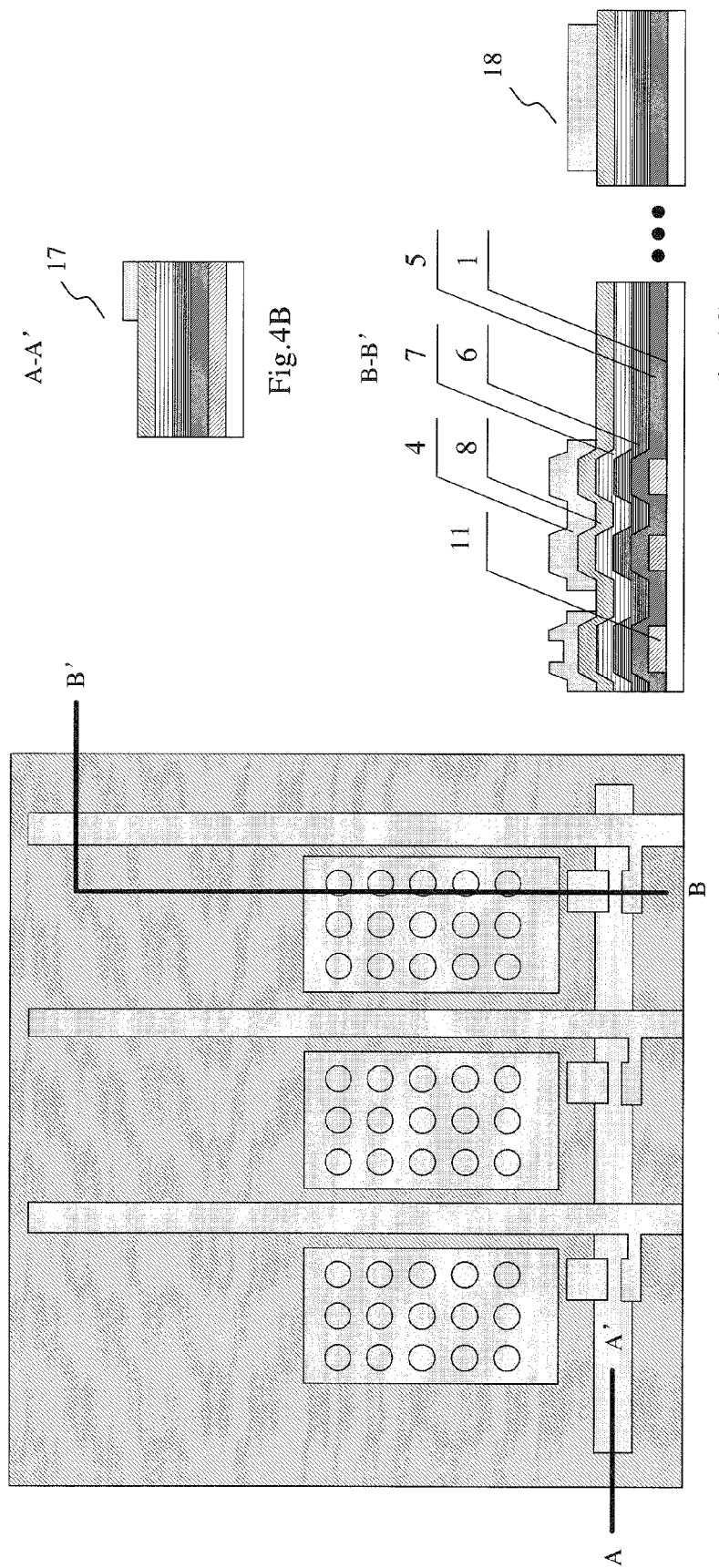

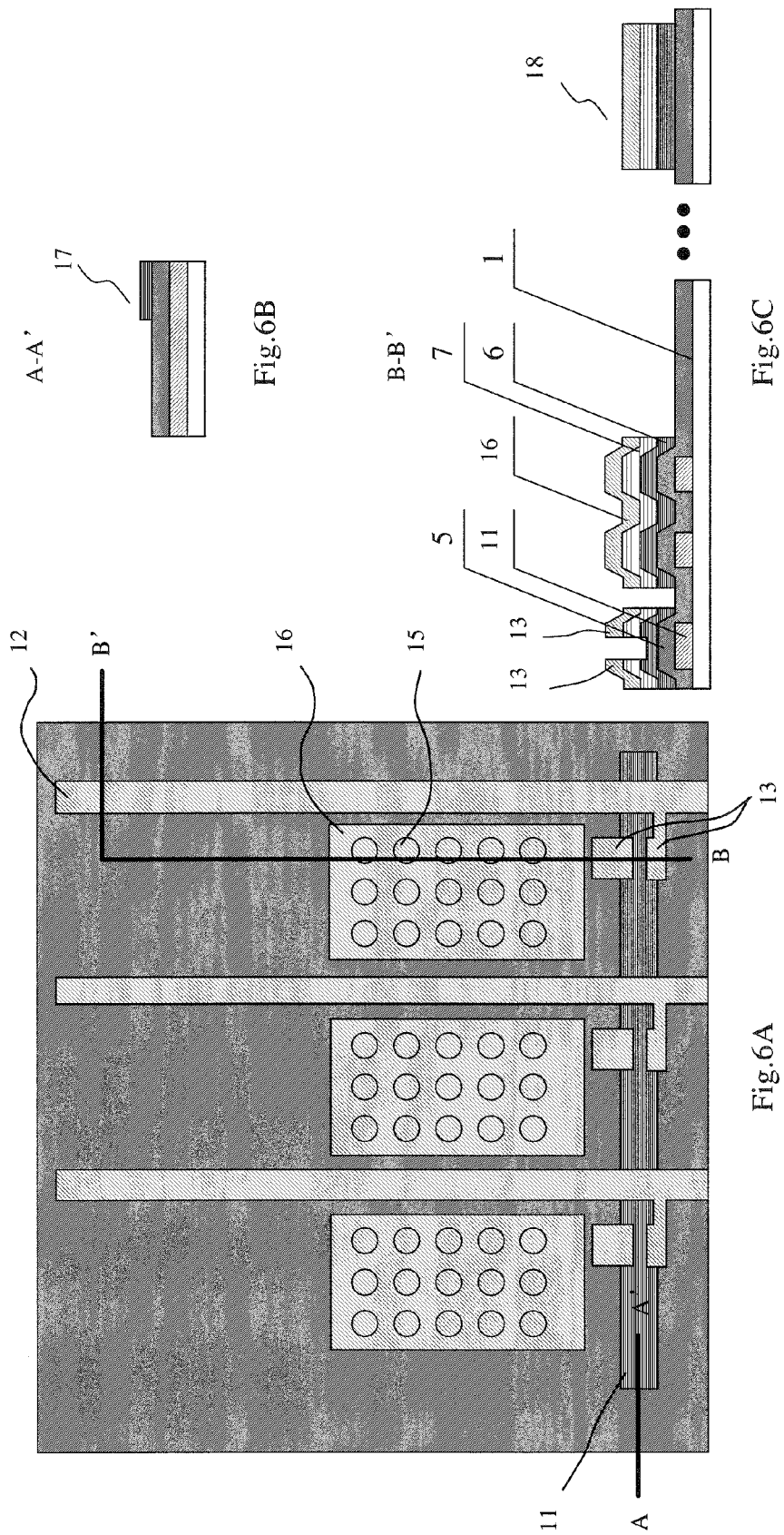

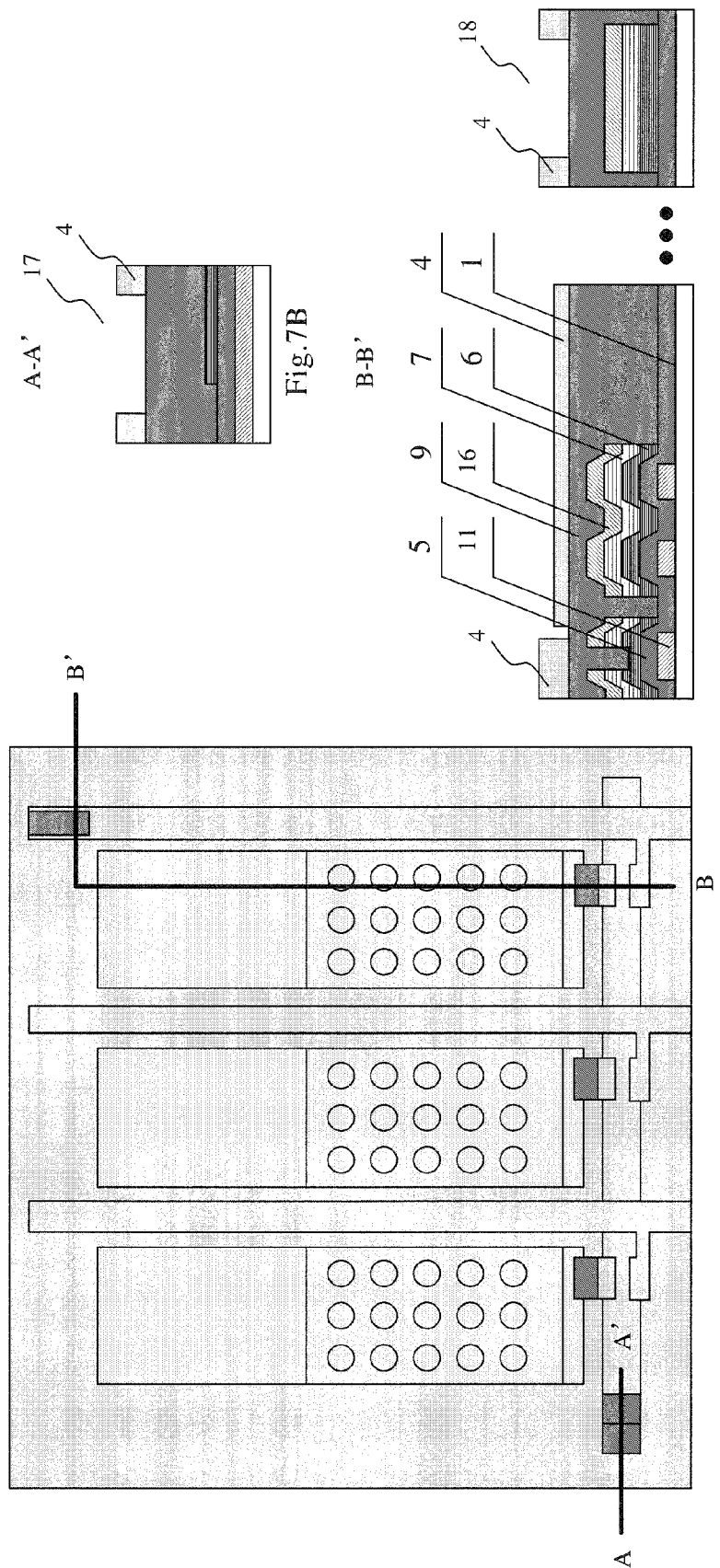

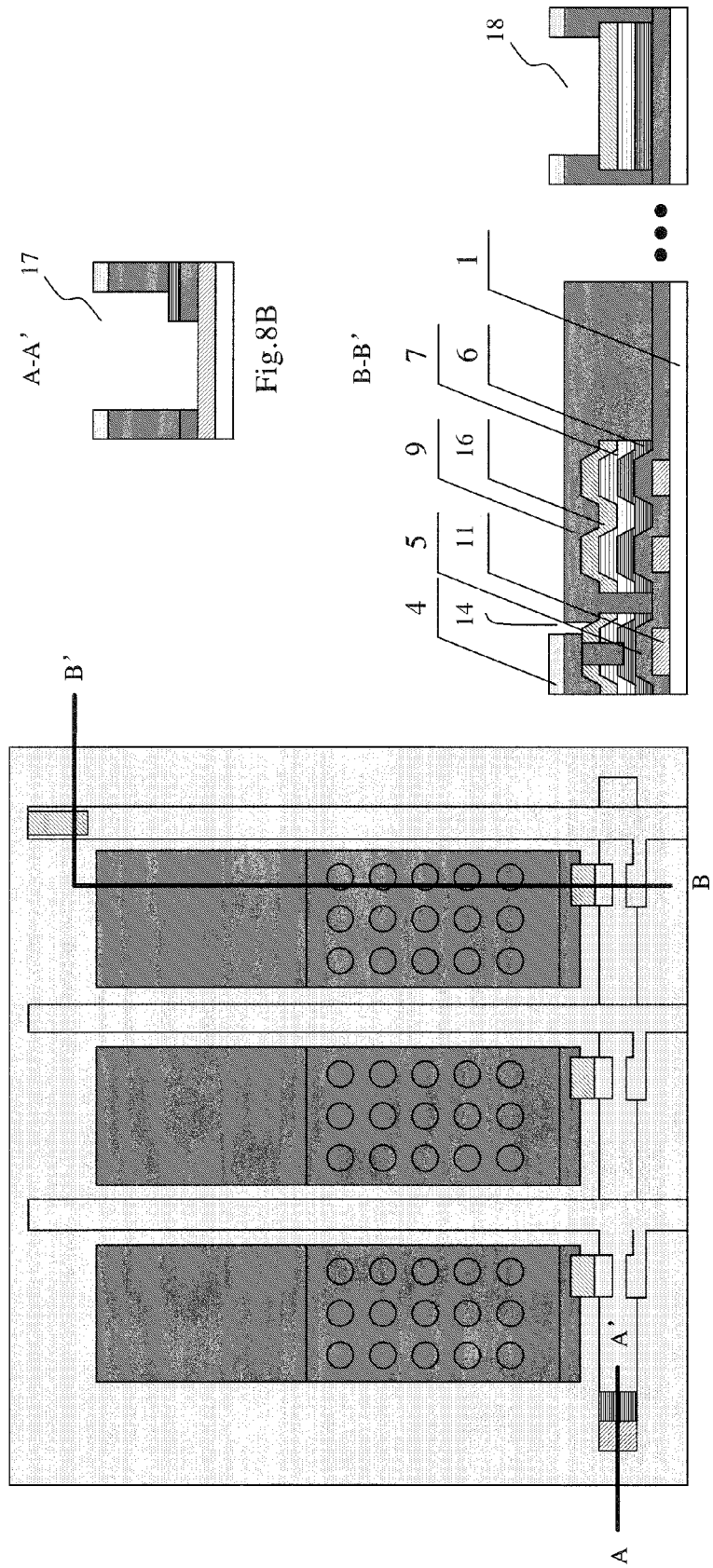

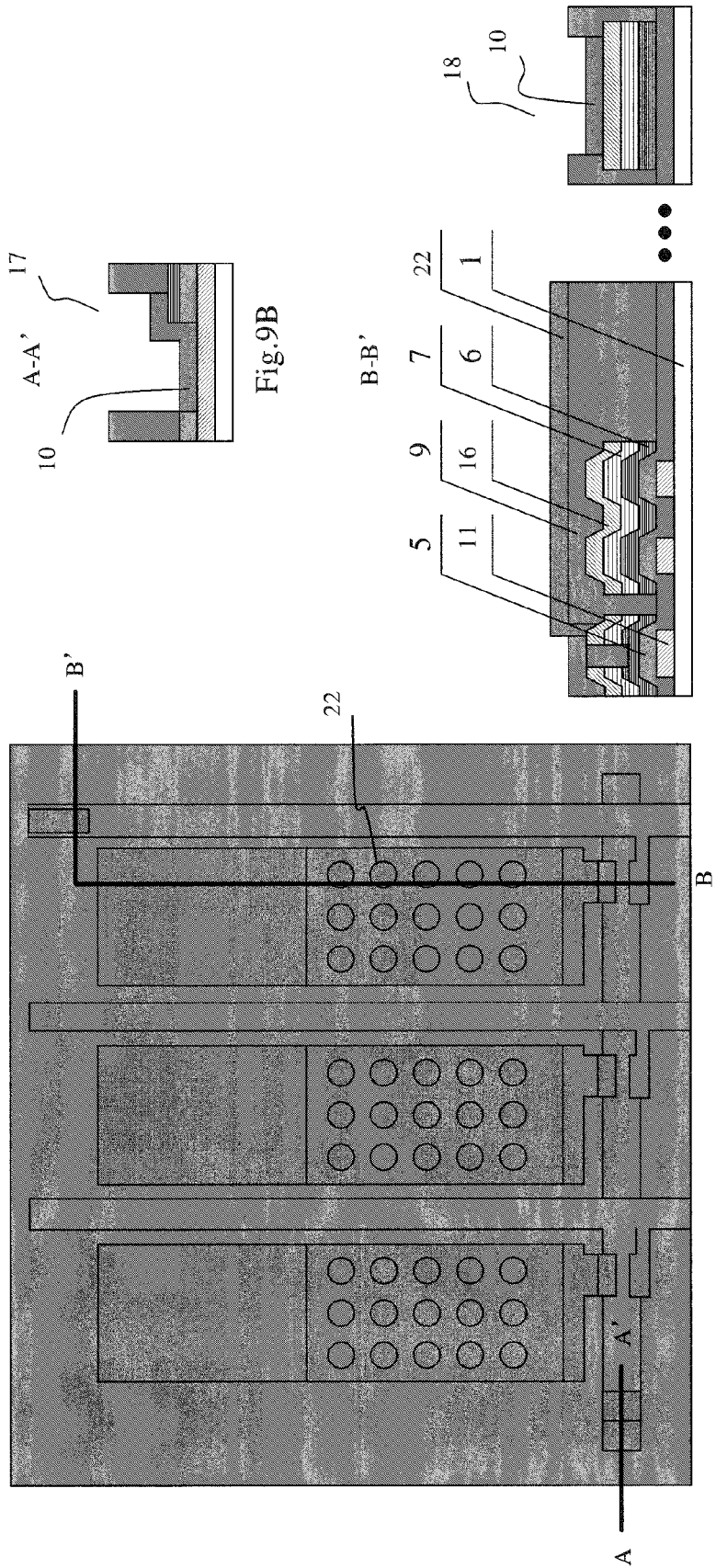

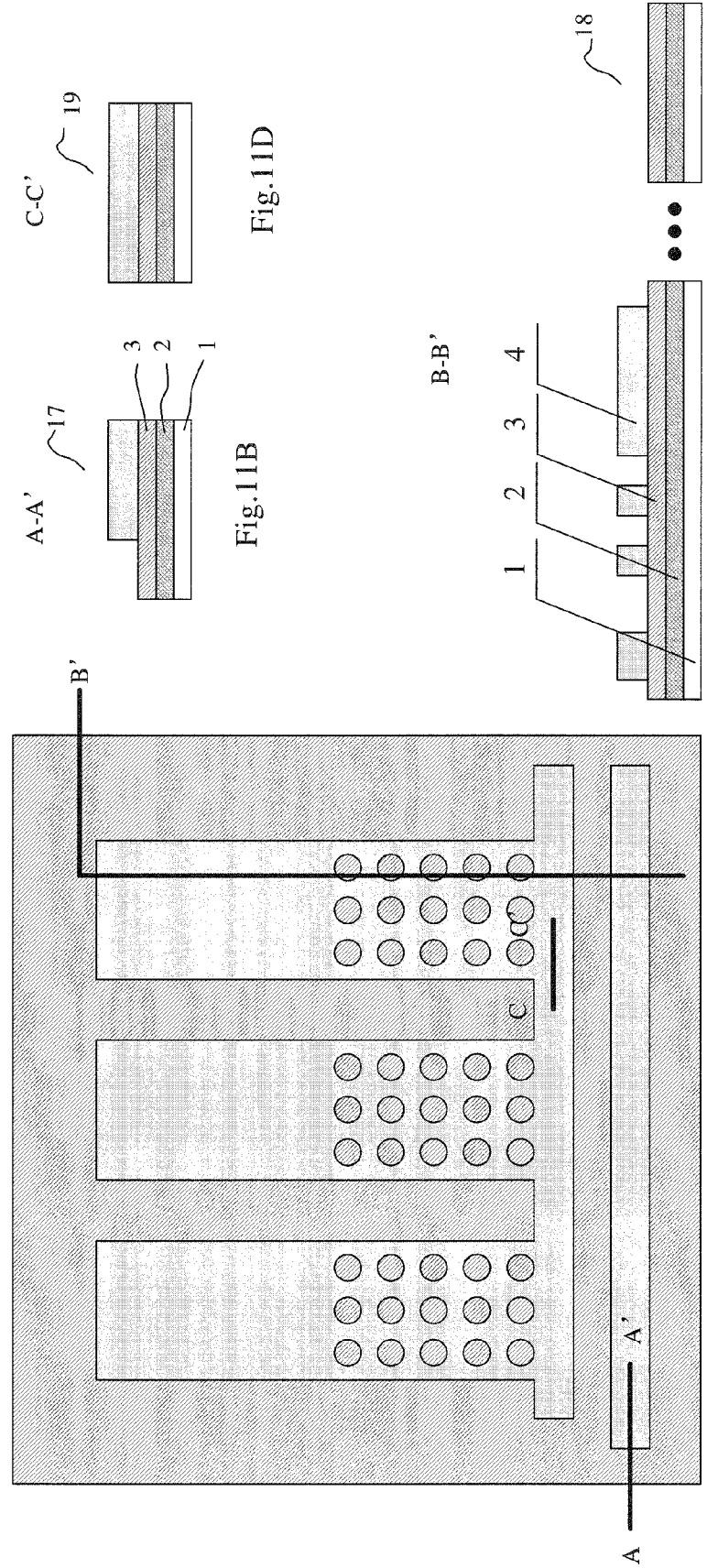

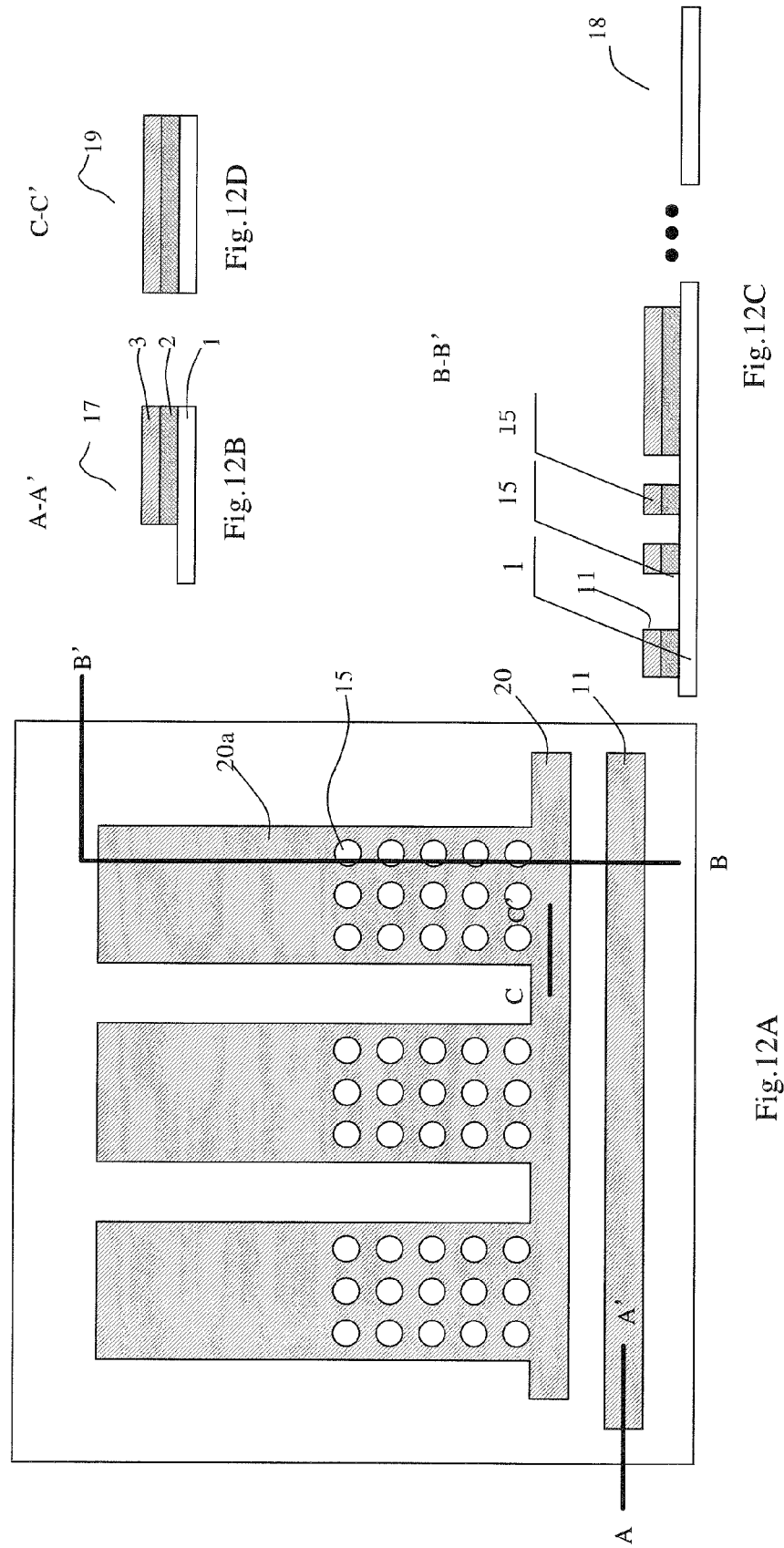

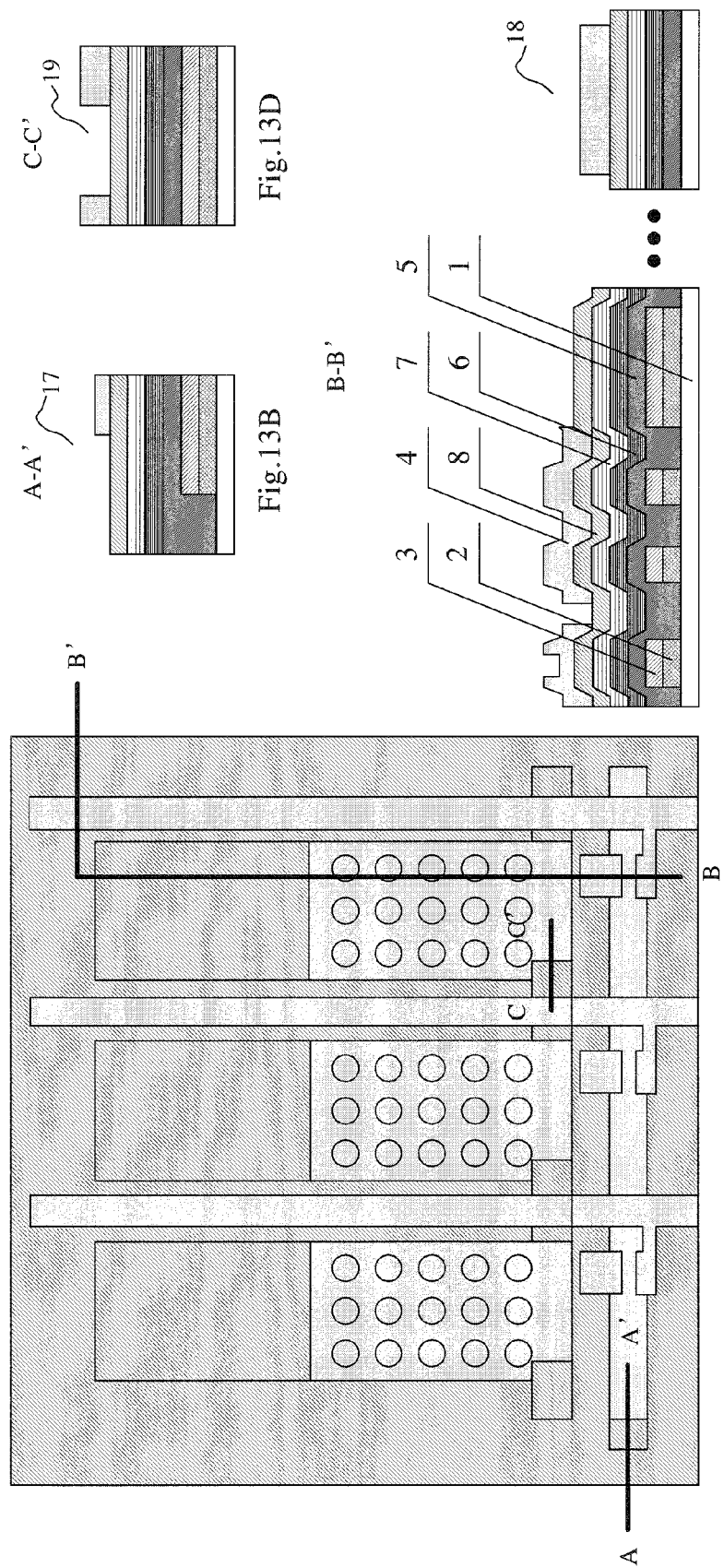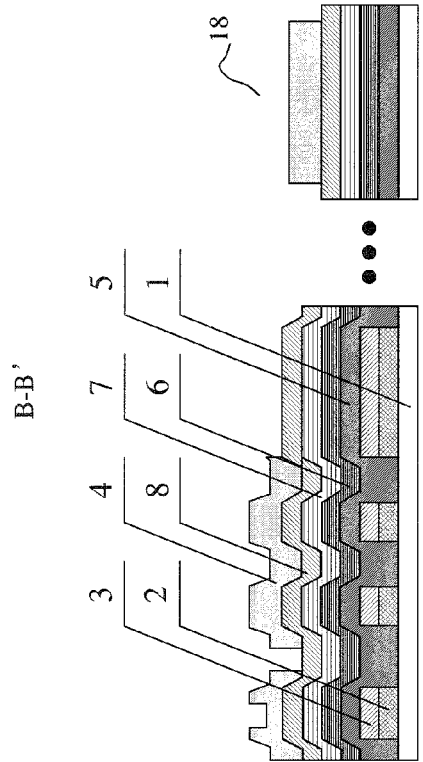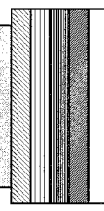

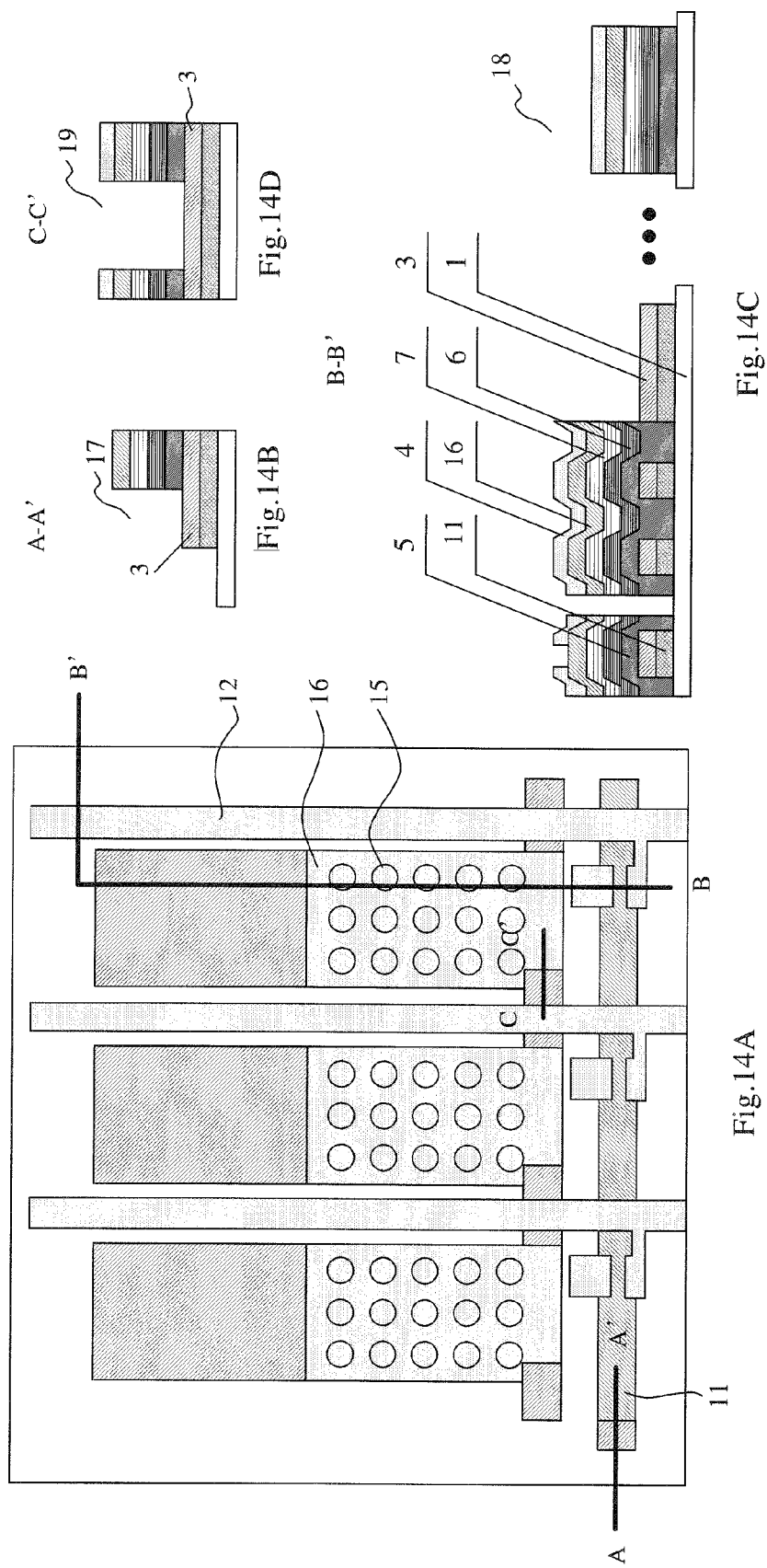

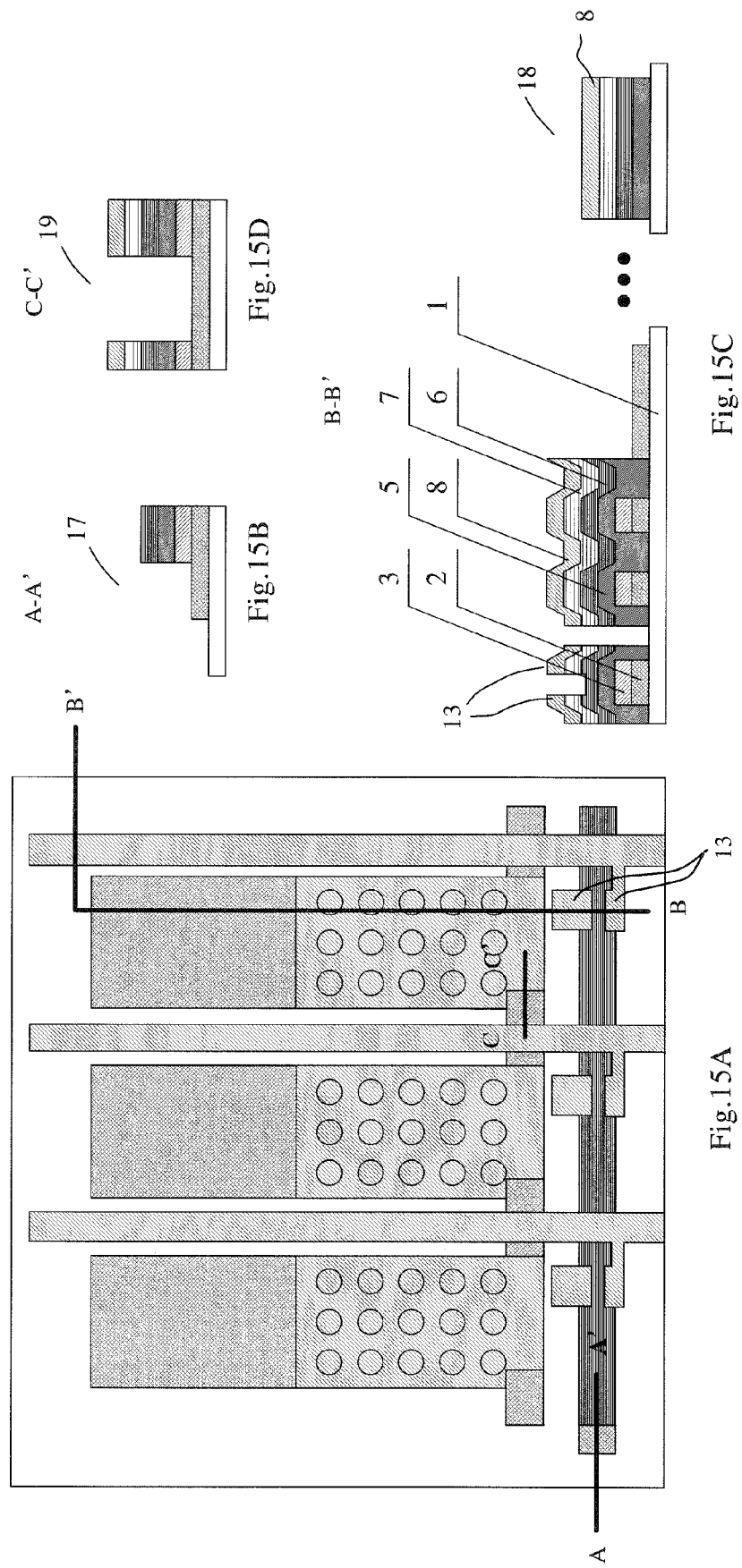

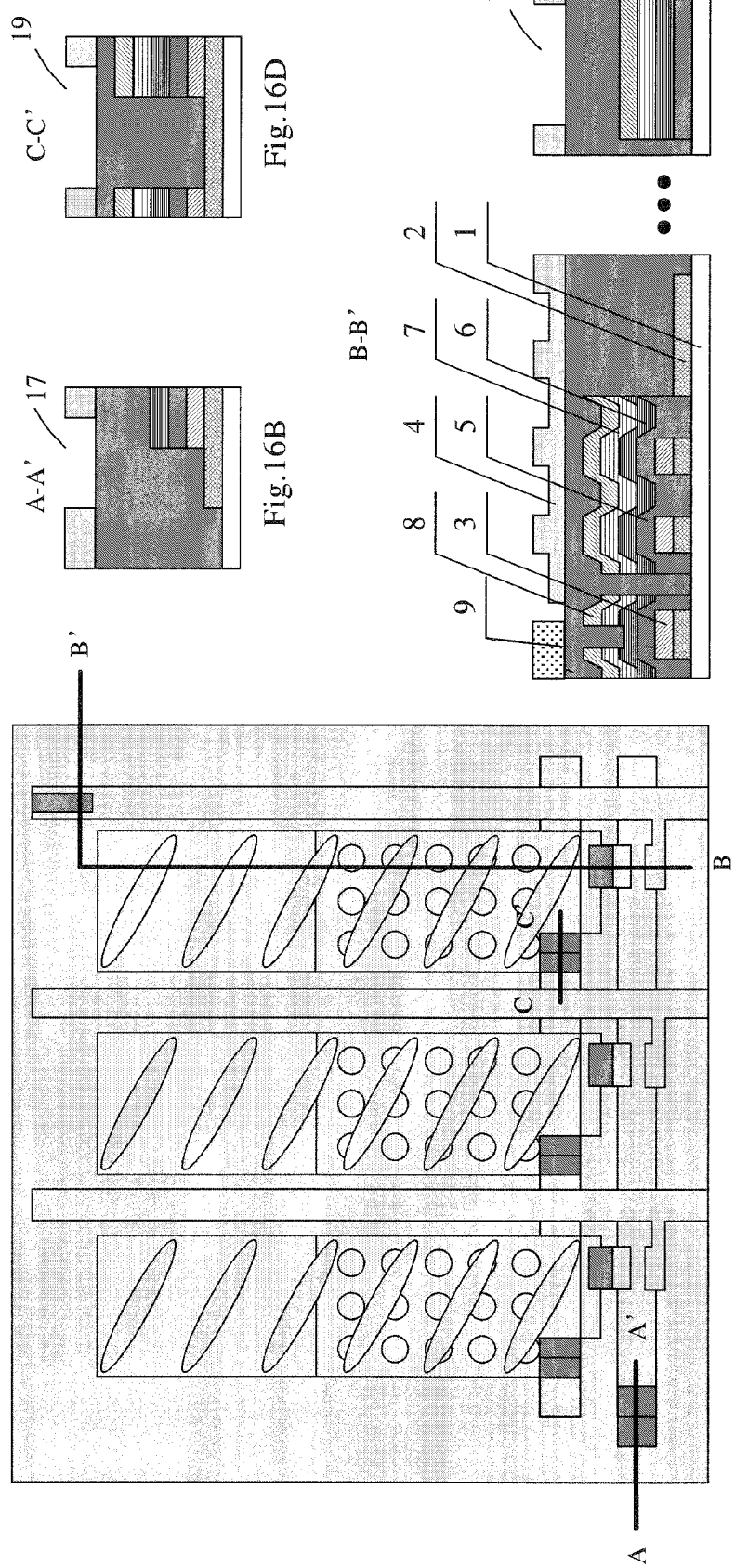

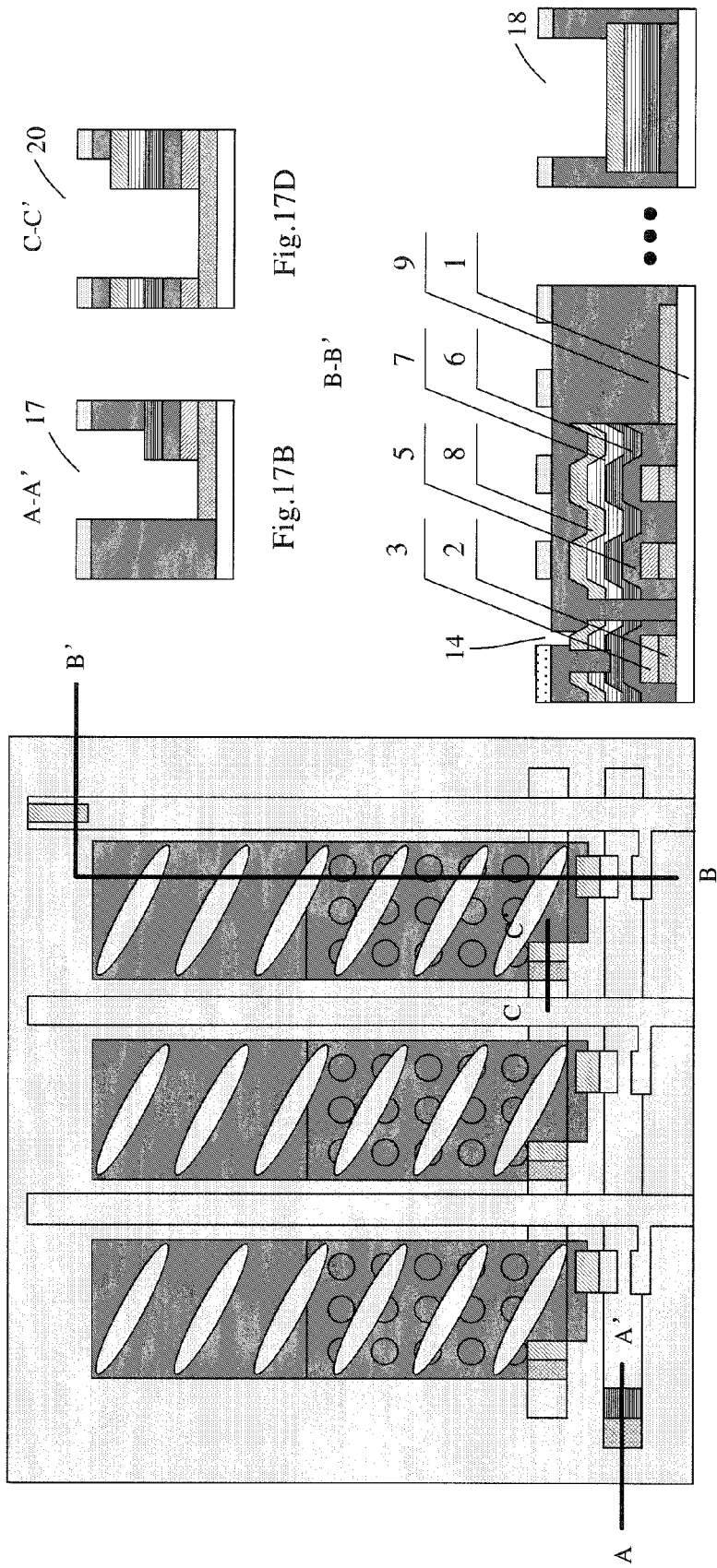

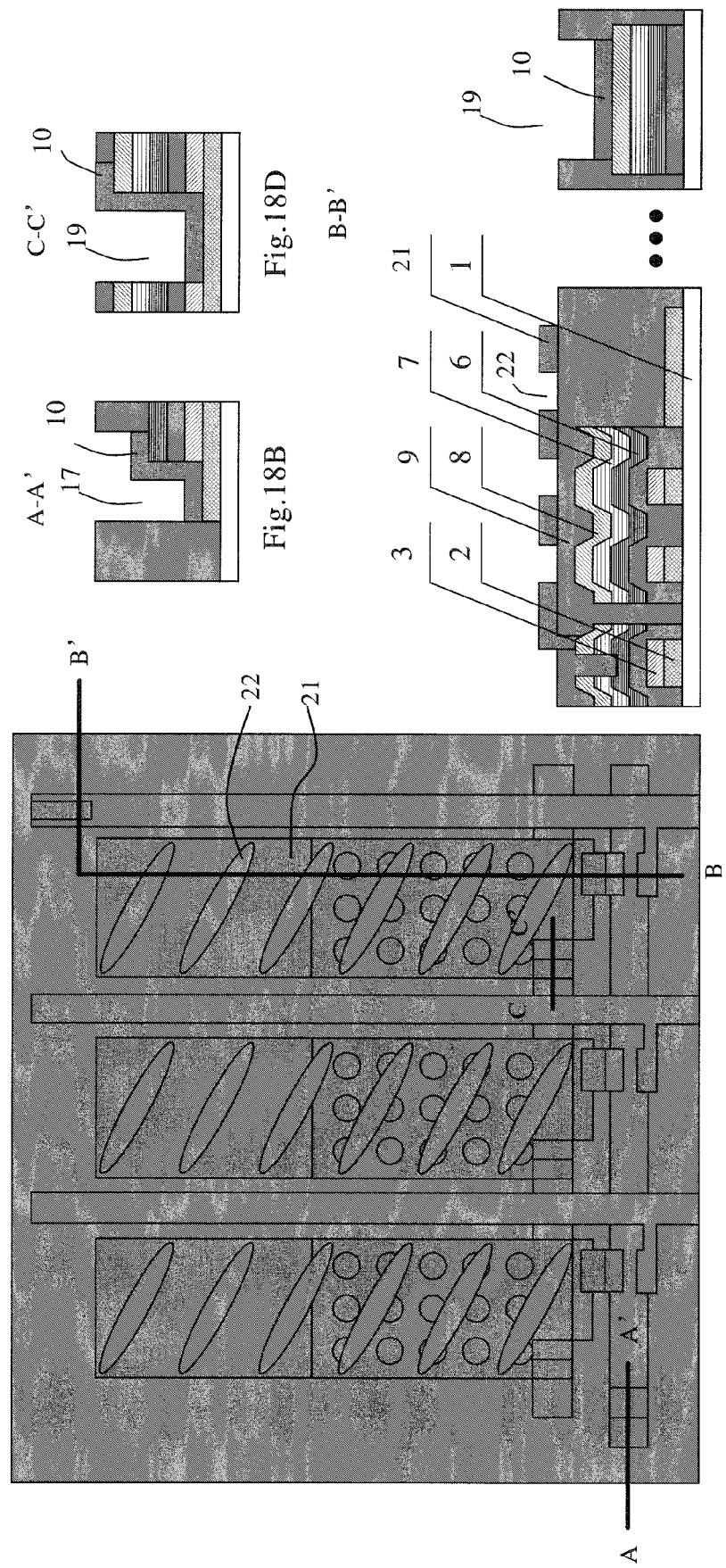

METHOD OF MANUFACTURING ARRAY SUBSTRATE OF TRANSREFLECTIVE LIQUID CRYSTAL DISPLAY

BACKGROUND

Embodiments of the present invention relate to a method of manufacturing an array substrate of transreflective liquid crystal display.

Recently, liquid crystal displays (LCDs) have prevailed in the market of flat panel displays (FPDs). LCDs can be divided as a vertical electric field type and a horizontal electric field type according to the direction of the electric field applied for driving the liquid crystal molecules. A twist nematic (TN) LCD belongs to the vertical electric field type; and a fringe field switching (FFS) LCD and an in-plane switching (IPS) LCD belong to the horizontal electric field type.

In the vertical electric field type LCD, the pixel electrode is formed on an array substrate and the common electrode is formed on a color filter substrate; however, in the horizontal electric field type LCD, both the pixel electrode and the common electrode are formed on the same array substrate. Therefore, an additional process to form the common electrode is required during manufacturing the array substrate of the horizontal electric field type LCD compared with the method for manufacturing the array substrate of the vertical electric field type LCD.

In addition, LCDs can be divided into transmissive, transreflective, and reflective types according to the light for display. Images are displayed by transmitting the light from the backlight in the transmissive LCD, by transmitting the light from the backlight and reflecting the light from the external environment in the transreflective LCD, and by reflecting the light from the external environment in the reflective LCD.

The pixel electrode can be formed of a reflective metal as a reflective plate in the reflective LCD and of a transparent conductive material in the transmissive LCD. In the transreflective LCD, the pixel electrode in the reflective region can be formed of a reflective metal as a reflective plate and the pixel electrode in the transmissive region can be formed of a transparent conductive material.

In order to improve the reflection efficiency of the reflective plate in a reflective LCD or a transreflective LCD, an embossing pattern is formed below the reflective plate so that uneven patterns are formed on the surface of the reflective electrode or the reflective plate.

In addition, many researches have been carried out widely to cut down production cost by reducing the mask number used in producing and improve production efficiency by simplifying the process.

A method of manufacturing an array substrate of a horizontal electric field type liquid crystal display by using a three-mask process has been proposed. Examples of the method can be found in Korean patent applications Nos. 10-2006-0048069 and 10-2006-0011814. The method specifically includes the following steps.

A first patterning process is conducted by subsequently depositing a common electrode layer and a first metal layer on a base substrate, patterning with a first dual tone mask to form a gate line with both the common electrode layer and the first metal layer and an electrode with the common electrode layer in the display region.

A second patterning process is conducted by subsequently depositing a first insulating layer, a semiconductor layer, a doped semiconductor layer, and a second metal layer, patterning with a second dual tone mask to form a TFT channel, a source/drain electrode and a data line.

A third patterning process is conducted by depositing a second insulating layer, patterning with a third dual tone mask to form a via hole in the second insulating layer, ashing the remained photoresist layer to thin the patterned photoresist layer, depositing a pixel electrode layer, and forming an electrode with slits after lifting off the remained photoresist.

Since the common electrode is not required to form on the array substrate of vertical electric field type liquid crystal display, only the gate line is formed in the first patterning process with a full tone mask.

Compared with the method for manufacturing an array substrate of transmissive liquid crystal display, a reflective plate and an embossing pattern below the reflective plate are added when manufacturing an array substrate of transreflective LCD, and thus the mask number used in producing is increased.

SUMMARY OF THE INVENTION

A method of manufacturing an array substrate of a transreflective LCD is provided in the present invention. The method comprises the manufacture of a pre-preparing layer and the manufacture of a post-preparing layer. The formation of the pre-preparing layer comprises: a first patterning process of forming a first metal layer on a base substrate, coating a first photoresist layer on the first metal layer, exposing and developing the first photoresist layer with a full tone mask to form a first photoresist pattern, and performing etching by using the first photoresist pattern to form an embossing pattern in a reflective portion of a display region and to form a gate line; a second patterning process of forming a first insulating layer, a semiconductor layer, an ohmic contact layer and a second metal layer sequentially on the substrate after the first patterning process, coating a second photoresist layer, exposing and developing the second photoresist layer with a first dual tone mask to form a second photoresist pattern, etching by using the second photoresist pattern to pattern the second metal layer to form a data line and to form a reflective plate in the reflective portion of the display region, ashing the second photoresist pattern and performing etching by using the remained photoresist pattern to form a thin film transistor channel region, a source electrode connected with the data line and a drain electrode.

Preferably, the formation of the post-preparing layer comprises: a third patterning process of forming a second insulating layer on the substrate after the second patterning process, coating a third photoresist layer, exposing and developing the third photoresist layer with a second dual mask to form a third photoresist pattern, forming a via hole on the drain electrode, depositing a pixel electrode layer after ashing the third photoresist pattern, forming a pixel electrode connected with the drain electrode through the via hole in the display region after lifting off the remained third photoresist pattern.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein:

FIG. 2A is a plane view after exposing and developing in a first patterning process during manufacturing an array substrate of a transreflective LCD according to the first embodiment of the invention; FIG. 2B is a sectional view taken along a line A-A' in FIG. 2A; FIG. 2C is a sectional view taken along a line B-B' in FIG. 2A;

FIG. 3A is a plane view after etching and removing the photoresist layer in the first patterning process during manufacturing an array substrate of a transreflective LCD according to the first embodiment of the invention; FIG. 3B is a sectional view taken along a line A-A' in FIG. 3A; FIG. 3C is a sectional view taken along a line B-B' in FIG. 3A;

FIG. 4A is a plane view after exposing and developing in a second patterning process during manufacturing an array substrate of a transreflective LCD according to the first embodiment of the invention; FIG. 4B is a sectional view taken along a line A-A' in FIG. 4A; FIG. 4C is a sectional view taken along a line B-B' in FIG. 4A;

FIG. 6A is a plane view after etching once more and removing the photoresist layer in the second patterning process during manufacturing an array substrate of a transreflective LCD according to the first embodiment of the invention; FIG. 6B is a sectional view taken along a line A-A' in FIG. 6A; FIG. 6C is a sectional view taken along a line B-B' in FIG. 6A;

FIG. 7A is a plane view after exposing and developing in a third patterning process during manufacturing an array substrate of a transreflective LCD according to the first embodiment of the invention; FIG. 7B is a sectional view taken along a line A-A' in FIG. 7A; FIG. 7C is a sectional view taken along a line B-B' in FIG. 7A;

FIG. 8A is a plane view after etching and removing the photoresist layer in the third patterning process during manufacturing an array substrate of a transreflective LCD according to the first embodiment of the invention; FIG. 8B is a sectional view taken along a line A-A' in FIG. 8A; FIG. 8C is a sectional view taken along a line B-B' in FIG. 8A;

FIG. 9A is a plane view after lifting-off the photoresist layer in the third patterning process during manufacturing an array substrate of a transreflective LCD according to the first embodiment of the invention; FIG. 9B is a sectional view taken along a line A-A' in FIG. 9A; FIG. 9C is a sectional view taken along a line B-B' in FIG. 9A;

FIG. 11A is a plane view after exposing and developing in a first patterning process during manufacturing an array substrate of a transreflective LCD according to the second embodiment of the invention; FIG. 11B is a sectional view taken along a line A-A' in FIG. 11A; FIG. 11C is a sectional view taken along a line B-B' in FIG. 11A; FIG. 11D is a sectional view taken along a line C-C' in FIG. 11A;

FIG. 12A is a plane view after etching and removing the photoresist layer in the first patterning process during manufacturing an array substrate of a transreflective LCD according to the second embodiment of the invention; FIG. 12B is a sectional view taken along a line A-A' in FIG. 12A; FIG. 12C is a sectional view taken along a line B-B' in FIG. 12A; FIG. 12D is a sectional view taken along a line C-C' in FIG. 12A;

FIG. 13A is a plane view after exposing and developing in a second patterning process during manufacturing an array substrate of a transreflective LCD according to the second embodiment of the invention; FIG. 13B is a sectional view taken along a line A-A' in FIG. 13A; FIG. 13C is a sectional view taken along a line B-B' in FIG. 13A; FIG. 13D is a sectional view taken along a line C-C' in FIG. 13A;

FIG. 14A is a plane view after etching and ashing the photoresist layer in the second patterning process during manufacturing an array substrate of a transreflective LCD according to the second embodiment of the invention; FIG. 14B is a sectional view taken along a line A-A' in FIG. 14A; FIG. 14C is a sectional view taken along a line B-B' in FIG. 14A; FIG. 14D is a sectional view taken along a line C-C' in FIG. 14A;

FIG. 15A is a plane view after etching once more and removing the photoresist layer in the second patterning process during manufacturing an array substrate of a transreflective LCD according to the second embodiment of the invention; FIG. 15B is a sectional view taken along a line A-A' in FIG. 15A; FIG. 15C is a sectional view taken along a line B-B' in FIG. 15A; FIG. 15D is a sectional view taken along a line C-C' in FIG. 15A;

FIG. 16A is a plane view after exposing and developing in a third patterning process during manufacturing an array substrate of a transreflective LCD according to the second embodiment of the invention; FIG. 16B is a sectional view taken along a line A-A' in FIG. 16A; FIG. 16C is a sectional view taken along a line B-B' in FIG. 16A; FIG. 16D is a sectional view taken along a line C-C' in FIG. 16A;

FIG. 17A is a plane view after etching and ashing the photoresist layer in the third patterning process during manufacturing an array substrate of a transreflective LCD according to the second embodiment of the invention; FIG. 17B is a sectional view taken along a line A-A' in FIG. 17A; FIG. 17C is a sectional view taken along a line B-B' in FIG. 17A; FIG. 17D is a sectional view taken along a line C-C' in FIG. 17A; and FIG. 18A is a plane view after lifting-off the photoresist layer in the third patterning process during manufacturing an array substrate of a transreflective LCD according to the second embodiment of the invention; FIG. 18B is a sectional view taken along a line A-A' in FIG. 18A; FIG. 18C is a sectional view taken along a line B-B' in FIG. 18A; FIG. 18D is a sectional view taken along a line C-C' in FIG. 18A.

DESCRIPTION OF THE EMBODIMENTS

In the embodiments of the invention, the layered structure that comprises at least gate lines, thin film transistors (TFTs), TFT channels and data lines is defined as a pre-preparing layer, and the layered structure that comprises at least pixel electrodes is defined as a post-preparing layer. In LCDs, a pixel region (or a display region) is defined by a gate line and a data line that intersects the gate line.

First Embodiment

Figure 1:
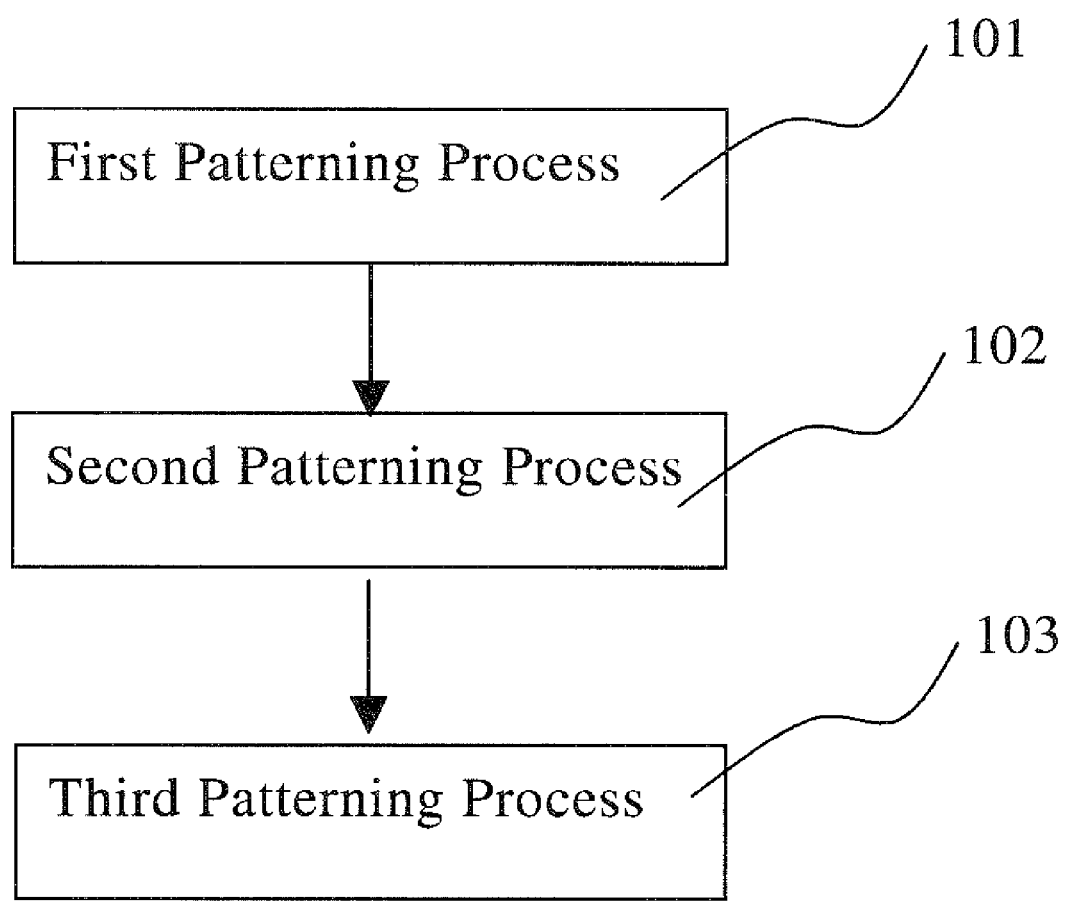
FIG. 1 is a schematic view showing a process flow for manufacturing an array substrate of a transreflective LCD according to a first embodiment of the invention.

FIG. 1 is a schematic view showing a process flow for manufacturing an array substrate of a transreflective LCD according to a first embodiment of the invention. As shown in FIG. 1, the method of manufacturing an array substrate of a transreflective LCD comprises the formation of the pre-preparing layer and the formation of the post-preparing layer. The formation of the pre-preparing layer can be implemented through the following steps.

A first patterning process 101 of depositing a first metal layer 3 on a base substrate 1, coating a photoresist layer 4 on the substrate 1 deposited with the first metal layer, and performing exposing and developing processes with a normal full tone mask.

FIG. 2A is a plane view after exposing and developing in a first patterning process during manufacturing an array substrate of a transreflective LCD according to the first embodiment of the invention, FIG. 2B is a sectional view taken along a line A-A' in FIG. 2A, and FIG. 2C is a sectional view taken along a line B-B' in FIG. 2A.

As shown in FIG. 2A to FIG. 2C, a first photoresist pattern is obtained through exposing and developing the photoresist layer 4 with the normal full tone mask. In the first photoresist pattern, the photoresist layer 4 is remained in a gate line region and in a reflective portion of the display region.

Also, a gate line connection portion 17 (see FIG. 2B) is covered with the photoresist layer 4, and a data line connection portion 18 (see FIG. 2C) is exposed by the photoresist layer 4.

FIG. 3A is a plane view after etching and removing the photoresist layer in the first patterning process during manufacturing an array substrate of a transreflective LCD according to the first embodiment of the invention, FIG. 3B is a sectional view taken along a line A-A' in FIG. 3A, and FIG. 3C is a sectional view taken along a line B-B' in FIG. 3A.

As shown in FIG. 3A to FIG. 3C, the first metal layer 3 in the region that is not covered by the photoresist layer 4 is etched so that a gate line 11 and an embossing pattern 15 are formed and both of them are formed through the first metal layer 3. The data line connection portion 18 is simultaneously etched to expose the underlying substrate 1 (see FIG. 3C).

Then, the remained photoresist layer 4 is stripped to expose the gate line and the embossing pattern.

After the first patterning process 101, a second patterning process 102 is next conducted by depositing a first insulating layer 5, a semiconductor layer 6, a doped semiconductor layer 7, and a second metal layer 8 sequentially on the substrate 1 and again uniformly coating the photoresist layer 4 on the substrate 1 formed with the second metal layer 8.

FIG. 4A is a plane view after exposing and developing in a second patterning process during manufacturing an array substrate of a transreflective LCD according to the first embodiment of the invention, FIG. 4B is a sectional view taken along a line A-A' in FIG. 4A, and FIG. 4C is a sectional view taken along a line B-B' in FIG. 4A.

As shown in FIG. 4A to FIG. 4C, a second photoresist pattern is obtained through exposing and developing the photoresist layer 4 with a first dual tone mask. In the second photoresist pattern, the photoresist layer is remained in the regions of the gate line, a TFT channel, the reflective portion of the display, a data line and a source/drain electrode. Specifically, the photoresist layer 4 is thinner in the gate line region and the TFT channel region and thicker in the region of the reflective portion of the display, the data line region and the source/drain electrode region.

The dual tone mask is a mask with a transmissive portion, a semi-transmissive portion and a non-transmissive portion. For example, a positive photoresist is used in this process, and the photoresist layer in the region corresponding to the transmissive portion of the dual tone mask is completely exposed and removed, the photoresist layer in the region corresponding to the non-transmissive portion is not exposed and remained, and the photoresist layer in the region corresponding to the semi-transmissive portion is partially exposed and partially removed. According to the way to realize the semi-transmissive portion, the examples of the dual tone mask may comprise a gray tone mask or a half tone mask.

At this process, a contact region of the gate line connection portion 17 is not covered, but the region other than this contact region of the gate line connection portion 17 is covered by the photoresist layer 4. The data line connection portion 18 is covered by the photoresist layer 4.

Figures 5A, 5B, 5C:
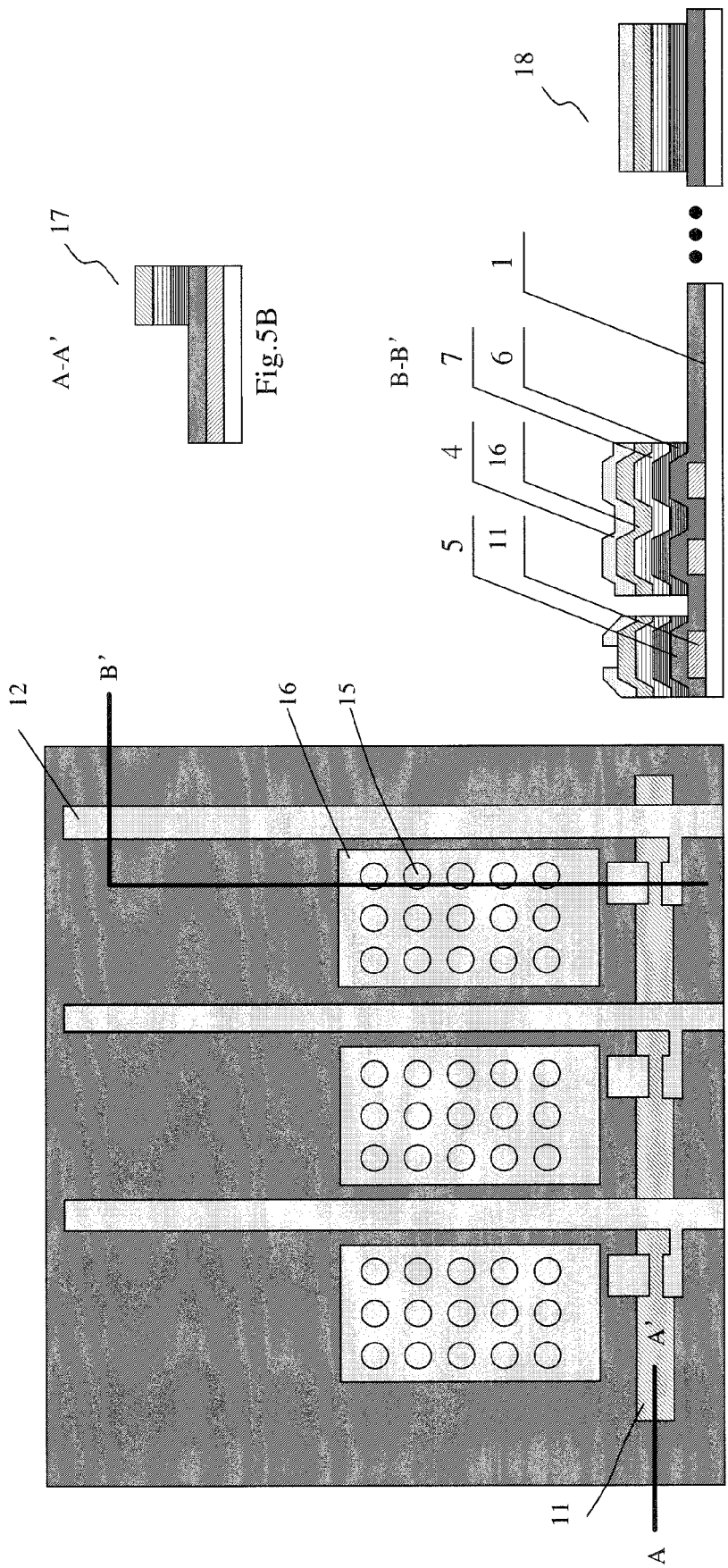
FIG. 5A is a plane view after etching and ashing the photoresist layer in the second patterning process during manufacturing an array substrate of a transreflective LCD according to the first embodiment of the invention.
FIG. 5B is a sectional view taken along a line A-A' in FIG. 5A.
FIG. 5C is a sectional view taken along a line B-B' in FIG. 5A.

FIG. 5A is a plane view after etching with the second photoresist pattern and ashing the photoresist layer in the second patterning process during manufacturing an array substrate of a transreflective LCD according to the first embodiment of the invention, FIG. 5B is a sectional view taken along a line A-A' in FIG. 5A, and FIG. 5C is a sectional view taken along a line B-B' in FIG. 5A.

As shown in FIG. 5A to FIG. 5C, the second metal layer 8, the doped semiconductor layer 7 and the semiconductor layer 6 are etched sequentially to form a data line 12 and to form a reflective plate 16 with the second metal layer 8 in the reflective portion of the display region. Since the embossing pattern 15 is formed with the first metal layer 3 below the reflective plate 16, the reflective plate 16 formed in the reflective portion of the display region has an embossing pattern thereon. In this process, the first insulating film 5 is exposed in the contact region of the gate line connection portion 17.

Then, the remained photoresist layer 4 is ashed to expose the second metal layer 8 in the gate line region and the TFT channel region. The first insulating layer 5 is exposed in the contact region of the gate line connection portion 17, and the second metal layer 8 is exposed in the region other than the contact region thereof. The data line connection portion 18 is still covered by the photoresist layer 4.

FIG. 6A is a plane view after etching once more and removing the photoresist layer in the second patterning process during manufacturing an array substrate of a transreflective LCD according to the first embodiment of the invention, FIG. 6B is a sectional view taken along a line A-A' in FIG. 6A, and FIG. 6C is a sectional view taken along a line B-B' in FIG. 6A;

As shown in FIG. 6A to FIG. 6C, the second metal layer 8, the doped semiconductor layer 7 and a portion of the semiconductor layer 6 that are not covered by the photoresist pattern are etched to form the TFT channel region, a drain electrode 13, and a source electrode connected with the data line 12.

Then, the remained photoresist layer 4 is removed by stripping to expose the data line 12 and the source/drain electrode 13. As for the formed TFT, a portion of the gate line 11 is used as the gate electrode thereof.

In this process, the first insulating layer 5 is exposed in the contact region of the gate line connection portion 17 and the semiconductor layer 6 is exposed in the region other than the contact region thereof. The second metal layer 8 is exposed in the data line connection portion 18.

Thus the formation of the pre-preparing layer is completed here, and subsequently the formation of the post-preparing layer is carried out.

Manufacturing the post-preparing layer comprises the following steps.

A third patterning process 103 is conducted by uniformly forming a second insulating layer 9 on the substrate after the second patterning process 102 (i.e., the substrate formed with the pre-preparing layer) and uniformly coating the photoresist layer 4 on the second insulating layer 9 on the substrate.

FIG. 7A is a plane view after exposing and developing in a third patterning process during manufacturing an array substrate of a transreflective LCD according to the first embodiment of the invention, FIG. 7B is a sectional view taken along a line A-A' in FIG. 7A, and FIG. 7C is a sectional view taken along a line B-B' in FIG. 7A.

As shown in FIG. 7A to FIG. 7C, a third photoresist pattern is obtained by exposing and developing the photoresist layer 4 with a second dual tone mask. In the third photoresist pattern, the photoresist layer 4 is remained in the regions except a via hole region on the drain electrode, the gate line connection portion 17 and the data line connection region 18. The photoresist layer 4 on the TFT side of the via hole region is thicker, while the photoresist layer 4 on the display region side of the via hole region and in the display region is thinner.

FIG. 8A is a plane view after etching with the third photoresist pattern and removing the photoresist layer in the third patterning process during manufacturing an array substrate of a transreflective LCD according to the first embodiment of the invention, FIG. 8B is a sectional view taken along a line A-A' in FIG. 8A, and FIG. 8C is a sectional view taken along a line B-B' in FIG. 8A.

As shown in FIG. 8A to FIG. 8C, the second insulating layer 9 in the region that is not covered by the photoresist layer 4 is etched to form a via hole 14 on the drain electrode.

In this process, since the first insulating layer 5 also can be etched by the etchant for etching the second insulating layer 9, the first insulating layer 5 in the contact region of the gate line connection portion 17 is etched at the time when the second insulating layer 9 is etched, so that the first metal layer 3 is exposed in the contact region of the gate line connection portion 17, and the second metal layer 8 is exposed in the contact region of the data line connection portion 18.

Then, the remained photoresist layer 4 is ashed to expose the second insulating layer 9 in the display region.

A pixel electrode layer 10 is deposited on the substrate after the photoresist layer 4 is ashed.

FIG. 9A is a plane view after lifting-off the photoresist layer in the third patterning process during manufacturing an array substrate of a transreflective LCD according to the first embodiment of the invention, FIG. 9B is a sectional view taken along a line A-A' in FIG. 9A, and FIG. 9C is a sectional view taken along a line B-B' in FIG. 9A.

As shown in FIG. 9A to 9C, the remained photoresist layer 4 is lifted off and the pixel electrode layer 10 thereon is simultaneously removed. Thus, a pixel electrode 22 connected with the drain electrode is formed in the display region.

Further, the pixel electrode layer 10 is remained in the contact region of the gate line connection portion 17 and also in the contact region of the data line connection portion 18.

Thus, the formation of the post-preparing layer is completed.

In the method of manufacturing the array substrate according to the first embodiment of the invention, the gate line 11 and the embossing pattern 15 are formed with a full tone mask, the data line 12, the source/drain electrode 13, the reflective plate 16 and the TFT region are formed with a first dual tone mask, and the pixel electrode 22 connected with the drain electrode 13 is formed with a second dual tone mask, and thus a vertical electric field type transreflective LCD is obtained.

Compared with the method for manufacturing the conventional vertical electric field type transmissive LCD, a reflective plate with an embossing pattern can be formed by the method according to the first embodiment without additional process to form an embossing pattern. Therefore, the cost of manufacturing the array substrate of the transreflective LCD can be reduced and the production yield of manufacturing the array substrate of the transreflective LCD can be improved.

In the first embodiment, for example, the first metal layer may be formed of a single layer of AlNd, Al, Cu, Mo, MoW or Cr, or of a composite layer of any combination of AlNd, Al, Cu, Mo, MoW, Ti and Cr.

In the first embodiment, for example, the second metal layer may be formed of a metal such as Al or Al alloy that has a reflectivity larger than 30%.

In the first embodiment, for example, the pixel electrode layer may be formed of indium tin oxide (ITO), indium zinc oxide (IZO), tin oxide (SnO2), and etc.

In the first embodiment, for example, the first insulating layer and the second insulating layer may be respectively formed of a single layer of $SiN_x$, $SiO_x$ or $SiO_xN_y$, or of a composite layer of any combination of $SiN_x$, $SiO_x$ and $SiO_xN_y$.

In the first embodiment, for example, the semiconductor layer may be formed of amorphous silicon, and the doped semiconductor layer may be formed of heavily-doped n+ amorphous silicon as an ohmic contact layer.

Second Embodiment

Figure 10:
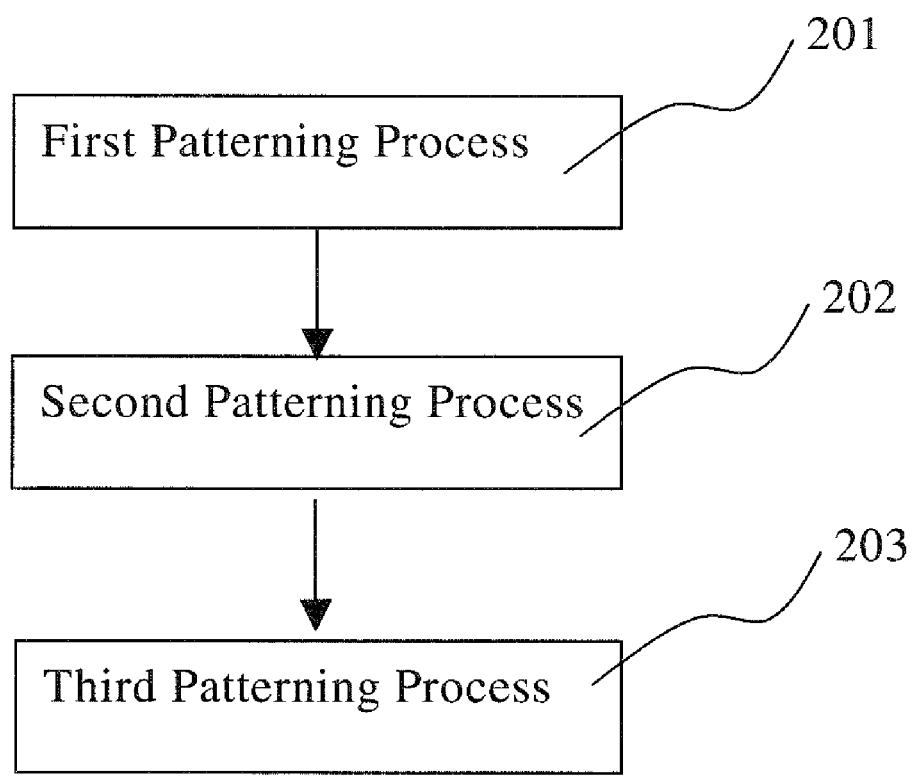
FIG. 10 is a schematic view showing a process flow for manufacturing an array substrate of a transreflective LCD according to a second embodiment of the invention.

FIG. 10 is a schematic view showing a process flow for manufacturing an array substrate of a transreflective LCD according to a second embodiment of the invention. As shown in FIG. 10, the method of manufacturing an array substrate of a transreflective LCD according to this embodiment also comprises the formation of the pre-preparing layer and the formation of the post-preparing layer. The formation of the pre-preparing layer can be implemented through the following steps.

A first patterning process 201 is conducted by forming, for example depositing, a common electrode layer 2 and a first metal layer 3 sequentially on a base substrate 1, and coating a photoresist layer 4 on the substrate 1 deposited with the first metal layer 3.

FIG. 11A is a plane view after exposing and developing in a first patterning process during manufacturing an array substrate of a transreflective LCD according to the second embodiment of the invention, FIG. 11B is a sectional view taken along a line A-A' in FIG. 11A, FIG. 11C is a sectional view taken along a line B-B' in FIG. 11A, and FIG. 11D is a sectional view taken along a line C-C' in FIG. 11A;

As shown in FIG. 11A to FIG. 11D, a first photoresist pattern is obtained through exposing and developing the photoresist layer 4 with a full tone mask. In the first photoresist pattern, the photoresist layer 4 is remained on a gate line, a common line, and a transmissive portion of the display region, while a portion of the reflective portion of the display region are not covered by the photoresist layer 4.

In this process, a gate line connection portion 17 is covered by the photoresist layer (see FIG. 11B), a data line connection portion 18 is not covered by the photoresist layer 4 (see FIG. 11C), and a common line connection portion 19 is covered by the photoresist layer 4 (see FIG. 11D).

FIG. 12A is a plane view after etching and removing the photoresist layer in the first patterning process during manufacturing an array substrate of a transreflective LCD according to the second embodiment of the invention, FIG. 12B is a sectional view taken along a line A-A' in FIG. 12A, FIG. 12C is a sectional view taken along a line B-B' in FIG. 12A, and FIG. 12D is a sectional view taken along a line C-C' in FIG. 12A.

As shown in FIG. 12A to FIG. 12D, the first metal layer 3 and the common electrode layer 2 in the region that is not covered by the photoresist layer are etched sequentially to form a gate line 11, a common line 20 and a display region pattern (including a common electrode 20a branching from the common line 20) and to form an embossing pattern 15 in the reflective portion of the display region. All of the gate line 11, the common line 20 and the patterns in the display region are formed with the stack of the common electrode layer 2 and the first metal layer 3.

In this process, the first metal layer 3 is exposed in the gate line connection portion 17, the substrate 1 is exposed in the data line connection portion 18, and the first metal layer 3 is exposed in the common line connection portion 19. Then, the remained photoresist layer 4 is removed for example by stripping to expose the first metal layer 3 of the gate line, the common line and the display region.

A second patterning process 202 is conducted by depositing a first insulating layer 5, a semiconductor layer 6, a doped semiconductor layer 7 and a second metal layer 8 sequentially on the substrate after the first patterning process 201, and uniformly coating the photoresist layer 4 on the second metal layer 8 on the substrate 1.

FIG. 13A is a plane view after exposing and developing in a second patterning process during manufacturing an array substrate of a transreflective LCD according to the second embodiment of the invention, FIG. 13B is a sectional view taken along a line A-A' in FIG. 13A, FIG. 13C is a sectional view taken along a line B-B' in FIG. 13A, and FIG. 13D is a sectional view taken along a line C-C' in FIG. 13A;

As shown in FIG. 13A to FIG. 13D, a second photoresist pattern is obtained through exposing and developing the photoresist layer 4 with a first dual tone mask. In the second photoresist pattern, the photoresist layer 4 is remained in the regions of the reflective portion of the display region, the gate line, a TFT channel region, a data line and a source/drain electrode 13. Specifically, the photoresist layer 4 is thinner on the gate line and the TFT channel region, but thicker on the reflective portion of the display region, the data line, and the source/drain electrode.

The contact region of the gate line connection portion 17 is not covered by the photoresist layer 4, and the region other than the contact region thereof is covered by the photoresist layer 4. The data line connection portion 18 is covered by the photoresist layer 4. The contact region of the common line connection portion 19 is not covered by the photoresist layer 4 and the region other than the contact region thereof is covered by the photoresist layer 4.

FIG. 14A is a plane view after etching and ashing the photoresist layer in the second patterning process during manufacturing an array substrate of a transreflective LCD according to the second embodiment of the invention, FIG. 14B is a sectional view taken along a line A-A' in FIG. 14A, FIG. 14C is a sectional view taken along a line B-B' in FIG. 14A, and FIG. 14D is a sectional view taken along a line C-C' in FIG. 14A.

As shown in FIG. 14A to FIG. 14D, the second metal layer 8, the doped semiconductor layer 7, the semiconductor layer 6, and the first insulating layer 5 are etched sequentially to form the data line and to form a reflective plate 16 with the second metal layer 8 in the reflective portion of the display region. Since the embossing pattern 15 has been already formed with both the common electrode layer 2 and the first metal layer 3 during the first patterning process 201, the reflective plate 16 has an embossing pattern thereon.

In this process, the first metal layer 3 is exposed in the contact region of the gate line connection portion 17, and the first metal layer 3 is also exposed in the contact region of the common line connection portion 19.

Then, the photoresist layer 4 is ashed. Thus, the first metal layer 3 is exposed in the contact region of the gate line connection portion 17 and the second metal layer 8 is exposed in the region other than the contact region thereof. The data line connection portion 18 is still covered by the photoresist layer 4. The first metal layer 3 is exposed in the contact region of the common line connection portion 19, and the region other than the contact region of the common line connection portion 19 is still covered by the photoresist layer 4.

FIG. 15A is a plane view after etching once more and removing the photoresist layer in the second patterning process during manufacturing an array substrate of a transreflective LCD according to the second embodiment of the invention, FIG. 15B is a sectional view taken along a line A-A' in FIG. 15A, FIG. 15C is a sectional view taken along a line B-B' in FIG. 15A, and FIG. 15D is a sectional view taken along a line C-C' in FIG. 15A.

As shown in FIG. 15A to FIG. 15D, the second metal layer 8, the doped semiconductor layer 7 and a portion of the semiconductor layer 6 in the region that are not covered by the photoresist layer 4 are etched sequentially to form the source electrode 13 connected with the data line 12, the drain electrode 13 and the TFT channel region.

Then, the remained photoresist layer 4 is stripped to expose the data line 12, the source/drain electrode 13 and the reflective portion of the display region.

In this process, the common electrode layer 2 is exposed in the contact region of the gate line connection portion 17 and the semiconductor layer 6 is exposed in the region other than the contact region thereof. The second metal layer 8 is exposed in the data line connection portion 18. The common electrode layer 2 is exposed in the contact region of the common line connection portion 19 and the second metal layer 8 is exposed in the region other than the contact region thereof.

Thus the formation of the pre-preparing layer is completed and subsequently the formation of the post-preparing layer is carried out. Manufacturing the post-preparing layer comprises the following steps.

A third patterning process 203 is conducted by uniformly coating a second insulating layer 9 on the substrate after the second patterning process 102 (i.e., the substrate formed with the pre-preparing layer thereon) and uniformly coating the photoresist layer 4 on the second insulating layer 9 deposited on the substrate 1.

FIG. 16A is a plane view after exposing and developing in a third patterning process during manufacturing an array substrate of a transreflective LCD according to the second embodiment of the invention, FIG. 16B is a sectional view taken along a line A-A' in FIG. 16A, FIG. 16C is a sectional view taken along a line B-B' in FIG. 16A, and FIG. 16D is a sectional view taken along a line C-C' in FIG. 16A;

As shown in FIG. 16A to FIG. 16D, a third photoresist pattern is obtained through exposing and developing the photoresist layer 4 with a second dual tone mask. In the third photoresist pattern, the photoresist layer 4 is remained in the region other than a via hole region on the drain electrode 13, the gate line connection portion 17, the contact region of the data line connection portion 18 and the common line connection portion 19. Specifically, the photoresist layer 4 on the TFT side of the via hole region is thicker, while the photoresist layer 4 on the display region side of the via hole region is thinner. In the display region, the photoresist layer 4 in the region corresponding to slits 21 is thicker, while the photoresist layer 4 in the region not corresponding to the slits 21 is thinner.

FIG. 17A is a plane view after etching and ashing the photoresist layer in the third patterning process during manufacturing an array substrate of a transreflective LCD according to the second embodiment of the invention, FIG. 17B is a sectional view taken along a line A-A' in FIG. 17A, FIG. 17C is a sectional view taken along a line B-B' in FIG. 17A, and FIG. 17D is a sectional view taken along a line C-C' in FIG. 17A.

As shown in FIG. 17A to 17D, the second insulating layer 9 in the region that is not covered by the photoresist layer 4 is etched to form a via hole 14 on the drain electrode 13.

Then, the remained photoresist layer 4 is ashed. In the display region, the region not corresponding to the slits 21 is still covered by the photoresist layer 4.

In this process, the common electrode layer 2 is exposed in the contact region of the gate line connection portion 17. The second metal layer 8 is exposed in the contact region of the data line connection portion 18 and the region other than the contact region of the data line connection portion 18 is still covered by the photoresist layer 4. The common electrode layer 2 is exposed in the contact region of the common line connection portion 19 and the second metal layer 8 is exposed in the region other than the contact region thereof.

A pixel electrode layer 10 is deposited on the substrate after the photoresist ashing process.

FIG. 18A is a plane view after lifting-off the photoresist layer in the third patterning process during manufacturing an array substrate of a transreflective LCD according to the second embodiment of the invention, FIG. 18B is a sectional view taken along a line A-A' in FIG. 18A, FIG. 18C is a sectional view taken along a line B-B' in FIG. 18A, and FIG. 18D is a sectional view taken along a line C-C' in FIG. 18A.

As shown in FIG. 18A to FIG. 18D, the remained photoresist layer 4 is lifted off and the pixel electrode layer 10 thereon is simultaneously removed. At this time, a pixel electrode 21 connected with the drain electrode 13 is formed in the display region and the pixel electrode 21 has slits 22.

In this process, the pixel electrode layer 10 is remained in the contact region of the gate line connection portion 17. The pixel electrode layer 10 is remained in the contact region of the data line connection portion 18 also. The common electrode layer 2 in the contact region of the common line connection portion 19 is connected with the second metal layer 8 in the region other than the contact region of the common line connection portion 19 through the pixel electrode layer 10, so that the reflective plate can receive the signals from the common line.

Thus, the formation of the post-preparing layer is completed.

In the method according to the second embodiment of the invention, the gate line 11, the common line 20 and the embossing pattern 15 are formed with a full tone mask, the data line 12, the source/drain electrode 13, the reflective plate 16 and the TFT channel region are formed with a first dual tone mask, and the pixel electrode 21 connected with the drain electrode 13 is formed with a second dual tone mask, and thus a horizontal electric field type transreflective LCD is obtained.

Compared with the method for manufacturing the conventional horizontal electric field type transmissive LCD, a full tone mask is used instead of a dual tone mask and a transreflective array substrate is obtained according to the second embodiment of the invention. Therefore, the cost of manufacturing the array substrate of the transreflective LCD can be reduced.

In addition, compared with the method for manufacturing the conventional horizontal electric field type transmissive LCD, an array substrate of the horizontal electric field type transreflective LCD is obtained in the case that an ashing process is omitted according to the second embodiment of the invention. Therefore, the production yield can be improved.

In the second embodiment, for example, the first metal layer may be formed of a single layer of AlNd, Al, Cu, Mo, MoW or Cr, or of a composite layer of any combination of AlNd, Al, Cu, Mo, MoW, Ti and Cr.

In the second embodiment, for example, the second metal layer may be formed of a metal such as Al which has a reflectivity larger than 30%.

In the second embodiment, for example, the common electrode layer and the pixel electrode layer may be formed of indium tin oxide (ITO) or indium zinc oxide (IZO).

In the second embodiment, for example, the first insulating layer and the second insulating layer may be respectively formed of a single layer of $SiN_x$, $SiO_x$ or $SiO_xN_y$, or of a composite layer of any combination of $SiN_x$, $SiO_x$ and $SiO_xN_y$.

In the second embodiment, for example, the semiconductor layer may be formed of amorphous silicon, and the doped semiconductor layer may be formed of heavily-doped n+ amorphous silicon as an ohmic contact layer.

In the above embodiments, the semiconductor layer and the doped semiconductor layer can be integrally referred to as an active layer, and the doped semiconductor layer may also be referred to as an ohmic contact layer.

It should be appreciated that the embodiments described above are intended to illustrate but not limit the present invention. Although the present invention has been described in detail herein with reference to the preferred embodiments, it should be understood by those skilled in the art that the present invention can be modified and some of the technical features can be equivalently substituted without departing from the spirit and scope of the present invention.

What is claimed is:

1. A method of manufacturing an array substrate of a transreflective LCD, comprising formation of a pre-preparing layer and formation of a post-preparing layer, wherein the formation of the pre-preparing layer comprises:

a first patterning process of forming a first metal layer on a base substrate, coating a first photoresist layer on the first metal layer, exposing and developing the first photoresist layer with a full tone mask to form a first photoresist pattern, and performing etching by using the first photoresist pattern to form an embossing pattern in a reflective portion of a display region and to form a gate line; and a second patterning process of forming a first insulating layer, a semiconductor layer, an ohmic contact layer and a second metal layer sequentially on the substrate after the first patterning process, coating a second photoresist layer, exposing and developing the second photoresist layer with a first dual tone mask to form a second photoresist pattern, etching by using the second photoresist pattern to pattern the second metal layer to form a data line and to form a reflective plate in the reflective portion of the display region, ashing the second photoresist pattern and performing etching by using the remained photoresist pattern to form a thin film transistor (TFT) channel region, a source electrode connected with the data line and a drain electrode.

2. The method according to claim 1, wherein the formation of the post-preparing layer comprises:

a third patterning process of forming a second insulating layer on the substrate after the second patterning process, coating a third photoresist layer, exposing and developing the third photoresist layer with a second dual mask to form a third photoresist pattern, forming a via hole on the drain electrode, depositing a pixel electrode layer after ashing the third photoresist pattern, forming a pixel electrode connected with the drain electrode through the via hole in the display region after lifting off the remained third photoresist pattern.

3. The method according to claim 2, wherein the second metal layer is formed of a metal which has a reflectivity larger than 30%.

4. The method according to claim 2, wherein the first metal layer are formed of a single layer of a material selected from the group consisting of AlNd, Al, Cu, Mo, MoW, and Cr, or of a composite layer of any combination of AlNd, Al, Cu, Mo, MoW, Ti and Cr.

5. The method according to claim 2, wherein the first dual tone mask and the second dual tone mask are selected from the group consisting of a gray tone mask and a half tone mask.

6. The method according to claim 2, wherein the pixel electrode layer is formed of a material selected from the group consisting of indium tin oxide, indium zinc oxide, and tine oxide.

7. The method according to claim 2, wherein the second insulating layer is formed of a single layer of a material selected from the group consisting of $SiN_x$, $SiO_x$ or $SiO_xN_y$, or of a composite layer of any combination of $SiN_x$, $SiO_x$ and $SiO_xN_y$.

8. The method according to claim 1, wherein the first patterning process comprises:
    forming a common electrode layer and the first metal layer sequentially on the base substrate, coating the first photoresist layer on the first metal layer, etching after exposing and developing the first photoresist layer to form the first photoresist pattern with the full tone mask to form the gate line and patterns in the display region with both the common electrode layer and the first metal layer and also to form the embossing pattern in the reflective portion of the display region.

9. The method according to claim 8, wherein the formation of the post-preparing layer comprises:
    a third patterning process of forming a second insulating layer on the substrate after the second patterning process, coating a third photoresist layer, exposing and developing the third photoresist layer with a second dual mask to form a third photoresist pattern, forming a via hole on the drain electrode, depositing a pixel electrode layer after ashing the third photoresist pattern, forming a pixel electrode with a gap connected with the drain electrode through the via hole in the display region after lifting off the remained third photoresist pattern.

10. The method according to claim 9, wherein the second metal layer is formed of a metal which has a reflectivity larger than 30%.

11. The method according to claim 9, wherein the first dual tone mask and the second dual tone mask are selected from the group consisting of a gray tone mask and a half tone mask.

12. The method according to claim 9, wherein the pixel electrode layer is formed of a material selected from the group consisting of indium tin oxide, indium zinc oxide, and tin oxide.

13. The method according to claim 9, wherein the second insulating layer is formed of a single layer of a material selected from the group consisting of $SiN_x$, $SiO_x$ or $SiO_xN_y$, or of a composite layer of any combination of $SiN_x$, $SiO_x$ and $SiO_xN_y$.

14. The method according to claim 8, wherein the second metal layer is formed of a metal which has a reflectivity larger than 30%.

15. The method according to claim 8, wherein the first metal layer are formed of a single layer of a material selected from the group consisting of AlNd, Al, Cu, Mo, MoW, and Cr, or of a composite layer of any combination of AlNd, Al, Cu, Mo, MoW, Ti and Cr.

16. The method according to claim 8, wherein the first dual tone mask is selected from the group consisting of a gray tone mask and a half tone mask.

17. The method according to claim 1, wherein the second metal layer is formed of a metal which has a reflectivity larger than 30%.

18. The method according to claim 1, wherein the first metal layer are formed of a single layer of a material selected from the group consisting of AlNd, Al, Cu, Mo, MoW, and Cr, or of a composite layer of any combination of AlNd, Al, Cu, Mo, MoW, Ti and Cr.

19. The method according to claim 1, wherein the first dual tone mask is selected from the group consisting of a gray tone mask and a half tone mask.

20. The method according to claim 1, wherein the first insulating layer is formed of a single layer of a material selected from the group consisting of $SiN_x$, $SiO_x$ and $SiO_xN_y$, or of a composite layer of any combination of $SiN_x$, $SiO_x$ and $SiO_xN_y$.

* * * * *